W. J. SPIRO.
SECURING BOLT.
APPLICATION FILED MAR. 8, 1920.
1,356,835.  Patented Oct. 26, 1920.
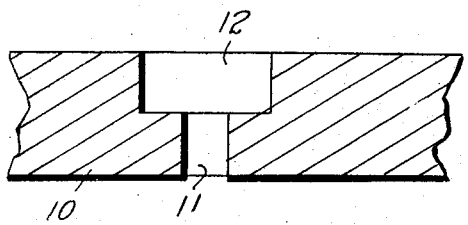
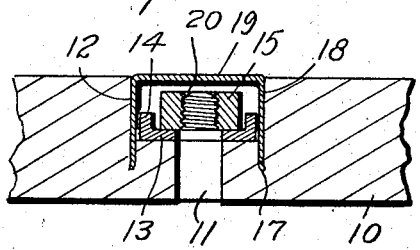
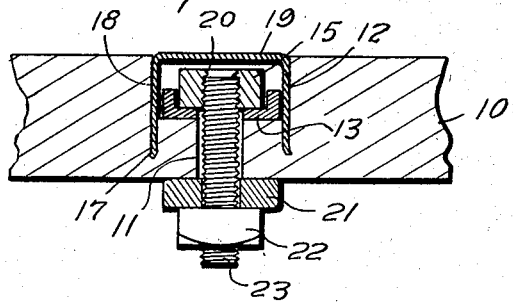
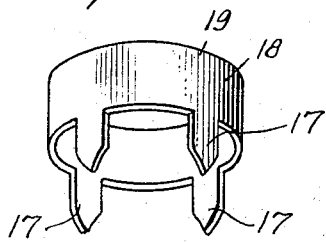
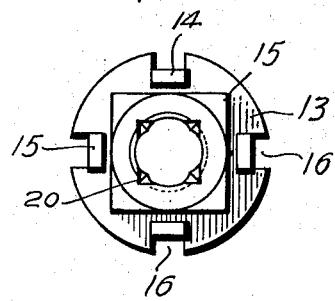
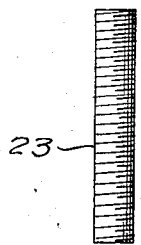
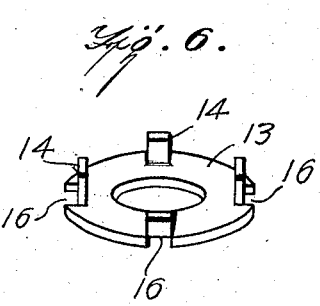
Inventor
WALTER J. SPIRO,
By
Alfred T. Gage.
Attorney

UNITED STATES PATENT OFFICE.

WALTER J. SPIRO, OF WHITE PLAINS, NEW YORK.

SECURING-BOLT.

1,356,835. Specification of Letters Patent. Patented Oct. 26, 1920.

Application filed March 8, 1920. Serial No. 364,288.

*To all whom it may concern:*

Be it known that I, WALTER J. SPIRO, citizen of the United States, residing at White Plains, in the county of Westchester and State of New York, have invented certain new and useful Improvements in Securing-Bolts, of which the following is a specification.

This invention relates to a securing bolt and particularly to a construction wherein a nut is secured upon a body portion and adapted to receive a threaded stem when the body is to be attached to a supporting structure.

The invention has for an object to provide a novel and improved construction comprising an inclosing plate or cap carrying means for supporting a head nut against rotation and in position to receive a threaded stem to which a securing nut is applied at its opposite end.

A further object of the invention is to present an improved construction of body structure provided with a head nut secured thereon by an inclosing cap flush with the surface of the body and adapted to receive a securing stem when assembled, which permits the close nesting of the bodies for shipment or storage.

Another object of the invention is to provide a novel construction of inclosing cap having projections entering a body portion and interlocked with a holding plate formed with means thereon to retain a head nut against rotation and in position to receive the end of a threaded stem.

Other and further objects and advantages of the invention will be hereinafter set forth and the novel features thereof defined by the appended claims.

In the drawing,—

Figure 1 is a section showing a body prepared to receive the invention;

Fig. 2, a similar view showing the head nut and cap applied thereto.

Fig. 3 is a like view, with the parts assembled in applied position,

Fig. 4 is a top plan of the holding plate and head nut;

Fig. 5, a detail perspective of the inclosing cap;

Fig. 6, a similar view of the holding plate, and

Fig. 7, a detail elevation of the threaded stem.

Like numerals refer to like parts in the several figures of the drawing.

The numeral 10 designates a body of wood or other material to which the invention is applied, and this body may be of any desired character or configuration, although the invention is particularly adapted for application to antomobile running boards for securing the same to the vehicle structure. The body 10 is provided with an aperture 11 therethrough having an enlarged seat or socket 12 at its upper portion, as shown in Fig. 1. Upon the base of this socket a holding plate 13 is disposed and is provided with upwardly extending ears or lugs 14 adapted to retain a head nut 15 against rotation. As shown in Figs. 2 and 4, these lugs are spaced slightly from the nut so as to permit the latter to adjust itself to the inserted threaded stem 23, to be applied thereto. The lugs 14 may be formed on the plate in any desired manner, but a preferable construction thereof is shown in Figs. 4 and 6, where the lugs are cut from the periphery of the plate and bent upward, thus leaving slots 16 adapted to receive projections or prongs 17 depending from the inclosing cap or plate 18, as shown in Fig. 3. By this means the holding plate is retained against rotation, and the prongs 17 are driven into the body 10, which securely retains the cap in position with its upper face 19 flush or level with the surface of the body. The cap when thus applied performs a function of holding the plate and nut against rotation, and also inclosing these parts so that any end movement or play of the nut is not transmitted to the surface of the body. This is particularly important in the use of the invention with automobile running boards, where a mat or covering is used over the body and any longitudinal movement of the securing bolt tends to puncture or injure this covering, both in the shipment of the parts and in the application and use of the invention. In order that the threaded stem 16 shall not be extended entirely through the holding nut 15 so as to contact with and disengage the cap 18, the upper portion of this head nut is formed with a mutilated thread or other means, as at 20, to limit the extent to which the stem may be threaded therein.

In the application of the invention, the body may be secured to any desired support such as shown at 21, by means of a securing nut 22 threaded upon the free end of the stem 23.

In the application of the invention, the holding plate, head nut and cap are applied to the body, as shown in Fig. 2, and a plurality of these bodies may then be closely nested together for shipment and storage without danger of injury, as would occur if projecting bolts were carried thereby. The running board or other structure is thus provided with a head nut held thereon against rotation and effectively concealed and protected so that in the application of the stem or bolt thereto there is no danger of injury to the covering or surface of the body which is in complete condition to be applied in use. The threaded stem may be very economically formed from a rod cut to proper lengths and applied to the head nut. The disposition of the lugs upon the holding plate spaced from the nut as described permits a limited lateral movement of the latter, while the formation of the apertures in the body and holding plate allow an adjustment of the stem in all directions to bring it into proper threading relation with the nut. This clearance facilitates the ready application of the device and compensates for any slight difference in alinement with the member to which the body is attached.

While the construction of the holding plate and cap have been specifically shown and described, still the invention is not confined thereto, as changes and alterations may be made therein without departing from the spirit of the invention as defined by the claims.

The invention presents a very simple, efficient and economically manufactured construction by which a portion of the securing means for a body is carried thereby and applied in the manufacture thereof so that it may be quickly and conveniently assembled by an unskilled workman.

What I claim is:

1. In a securing bolt, the combination with a recessed body, of a head nut disposed in said recess and adapted to receive a threaded stem, and a cover secured to the body to inclose said recess and provided with means for retaining said nut against rotation as the stem is threaded therein.

2. In a securing bolt, a cover plate adapted to be secured to the body portion, a holding plate interlocked therewith and having retaining means, and a nut retained against rotation by said means.

3. In a securing bolt, a cover plate adapted to be secured to the body portion, a holding plate interlocked therewith and having retaining means, a nut retained against rotation by said holding plate, and a rotatable threaded securing stem adapted to engage said nut.

4. In a securing bolt, a cover plate adapted to be secured to the body portion, a holding plate interlocked therewith and having retaining means, a nut retained against rotation by said holding plate, a rotatable threaded securing stem adapted to engage said nut, and means carried by said nut to prevent the complete passage of said stem therethrough.

5. In a securing bolt, a cover plate adapted to be secured to the body portion, a holding plate interlocked therewith and having retaining means, a nut retained against rotation by said holding plate, a rotatable threaded securing stem adapted to engage said nut, and a mutilated portion at the upper face of said nut aperture to prevent the complete passage of said stem therethrough.

6. In a securing bolt, a cap plate having depending prongs, a holding plate having portions to embrace said prongs and lugs upon its upper face, and a head nut disposed relative to said lugs to prevent rotation of the nut.

7. In a securing bolt, a cap plate having depending prongs, a holding plate having portions to embrace said prongs and lugs upon its upper face, a head nut disposed relative to said lugs to prevent rotation of the nut, a threaded stem engaging said nut at one end, and a securing nut provided upon the opposite end of said stem.

8. In a securing bolt, a holding plate having lugs bent upward from the periphery thereof to provide adjacent slotted portions, an inclosing cap having prongs extending through said slotted portions and entering a body to which the plate is applied, and a nut disposed upon said plate intermediate of said prongs.

9. In a securing bolt, a holding plate provided with recesses upon its periphery and retaining lugs upon its upper face, a nut disposed between said lugs, and a cylindrical cap inclosing said nut and plate and provided with depending lugs extending through said recesses.

10. The combination with a body having an aperture therein with an enlarged socket at one end, of a holding plate disposed at the base of said socket and formed with lugs, a nut retained against rotation by said plate lugs, and an inclosing cap adapted to be driven into said body flush with one face thereof and engaging said plate to retain the same against rotation.

11. The combination with a body having an aperture therein with an enlarged socket at one end, of a holding plate disposed at the base of said socket and formed with lugs, a nut retained against rotation by said plate lugs, an inclosing cap adapted to be driven into said body flush with one face thereof and engaging said plate to retain the same against rotation, a rotatable threaded stem entering said nut, means carried by said nut to prevent the passage of the stem completely therethrough, and securing means carried by the opposite end of said stem.

12. The combination with a body having an aperture therein with an enlarged socket at one end, of an apertured holding plate having retaining lugs and disposed at the base of said socket, a nut retained by the lugs upon said plate against rotation while permitting lateral play thereon, and a stem of less diameter than the apertures in said body and plate to permit lateral movement into threading contact with said nut.

In testimony whereof I affix my signature.

WALTER J. SPIRO.